(12) United States Patent
Wada et al.

(10) Patent No.: US 12,081,867 B2
(45) Date of Patent: Sep. 3, 2024

(54) SYSTEM AND METHOD FOR SYSTEM FOR GENERATING AND DETECTING AN ELECTROMAGNETIC WAVE

(71) Applicant: CANON KABUSHIKI KAISHA, Tokyo (JP)

(72) Inventors: Zempei Wada, Saitama (JP); Takahiro Sato, Kanagawa (JP); Takeaki Itsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/154,747

(22) Filed: Jan. 13, 2023

(65) Prior Publication Data

US 2023/0156327 A1 May 18, 2023

Related U.S. Application Data

(63) Continuation of application No. 17/317,338, filed on May 11, 2021, now Pat. No. 11,588,968.

(30) Foreign Application Priority Data

May 15, 2020 (JP) .................................. 2020-085565

(51) Int. Cl.
*H04N 23/67* (2023.01)
*H04N 23/90* (2023.01)

(52) U.S. Cl.
CPC ........... *H04N 23/671* (2023.01); *H04N 23/90* (2023.01)

(58) Field of Classification Search
CPC ....... H04N 23/671; H04N 23/90; H04N 23/67
See application file for complete search history.

(56) References Cited

U.S. PATENT DOCUMENTS

| 2013/0265415 | A1* | 10/2013 | Oda | ................... | G01N 21/8806 348/131 |
| 2015/0014535 | A1* | 1/2015 | Bushmaker | ............... | G01J 3/42 250/340 |
| 2017/0352136 | A1* | 12/2017 | Uliyar | .................... | H04N 5/211 |
| 2019/0285013 | A1* | 9/2019 | Dudar | ................. | F02D 41/0007 |

FOREIGN PATENT DOCUMENTS

| JP | H04122841 A | 4/1992 |
| JP | 2008032394 A | 2/2008 |
| JP | 2012037293 A | 2/2012 |
| JP | 2015004619 A | 1/2015 |
| JP | 2015017851 A | 1/2015 |
| JP | 2017129460 A | 7/2017 |
| JP | 2017207288 A | 11/2017 |
| JP | 2018087725 A | 6/2018 |
| JP | 2019039939 A | 3/2019 |
| JP | 2020026989 A | 2/2020 |
| WO | 2016208049 A | 12/2016 |

* cited by examiner

*Primary Examiner* — Mekonnen D Dagnew
(74) *Attorney, Agent, or Firm* — Canon U.S.A., Inc. IP Division

(57) ABSTRACT

A system includes a transmission unit configured to generate an electromagnetic wave, a first reception unit configured to detect the electromagnetic wave, and a processing unit configured to determine whether an output of the electromagnetic wave from the transmission unit is more than or equal to a threshold based on first image information obtained by capturing an image of the transmission unit in a state where the transmission unit is irradiating the electromagnetic wave.

23 Claims, 8 Drawing Sheets

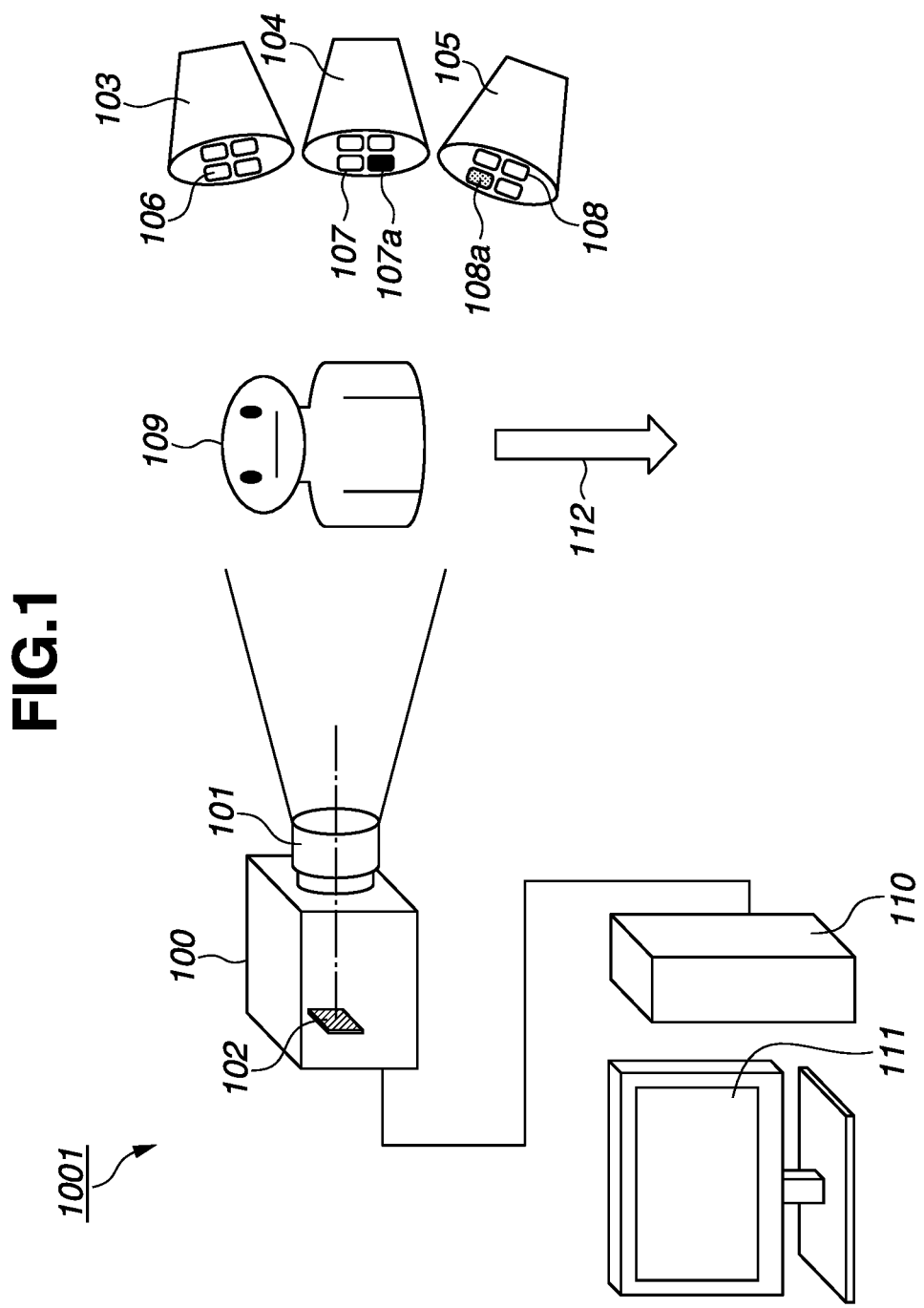

SYSTEM AND METHOD FOR SYSTEM FOR GENERATING AND DETECTING AN ELECTROMAGNETIC WAVE

CROSS-REFERENCE TO RELATED APPLICATION

This application is a Continuation U.S. application Ser. No. 17/317,338, filed May 11, 2021, which claims priority from Japanese Patent Application No. 2020-085565, filed May 15, 2020, which is hereby incorporated by reference herein in its entirety.

BACKGROUND OF THE DISCLOSURE

Field of the Disclosure

The aspect of the embodiments relates to a terahertz wave camera system.

Description of the Related Art

Japanese Patent Application Laid-Open No. 2018-087725 discusses a camera system to which a terahertz wave is applied. Specifically, Japanese Patent Application Laid-Open No. 2018-087725 discusses an active terahertz wave camera system having a configuration in which a terahertz wave is generated from a plurality of terahertz wave light sources, an object is irradiated with the terahertz wave, and then the terahertz wave reflected by the object is detected.

SUMMARY OF THE DISCLOSURE

According to an aspect of the embodiments, a system includes a transmission unit configured to generate an electromagnetic wave, a first reception unit configured to detect the electromagnetic wave, and a processing unit configured to determine whether an output of the electromagnetic wave from the transmission unit is more than or equal to a threshold based on first image information obtained by capturing an image of the transmission unit in a state where the transmission unit is irradiating the electromagnetic wave.

According to another aspect of the embodiments, a method for a system includes acquiring first image information obtained by capturing an image of a transmission unit in a state where the transmission unit is irradiating an electromagnetic wave, and determining whether an output of the electromagnetic wave from the transmission unit is more than or equal to a threshold based on the first image information.

Further features of the disclosure will become apparent from the following description of exemplary embodiments with reference to the attached drawings.

BRIEF DESCRIPTION OF THE DRAWINGS

FIG. 1 is a schematic diagram illustrating a configuration of a camera system according to a first exemplary embodiment.

DESCRIPTION OF THE EMBODIMENTS

Figure 2A:
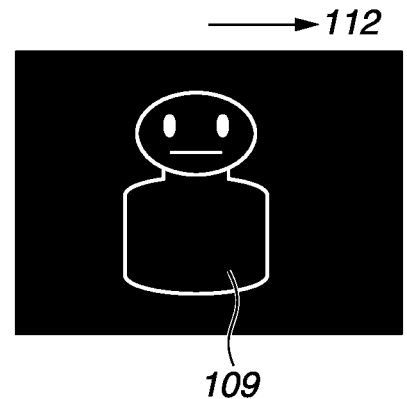
FIGS. 2A and 2B are schematic diagrams each illustrating an image captured by the camera system according to the first exemplary embodiment.

A terahertz wave is an electromagnetic wave in an invisible wavelength band and thus is not visible to human eyes. Accordingly, it is difficult for a human to visually check whether a terahertz wave at a desired frequency is generated from a light source.

Thus, if a malfunction occurs in a light source or a system and a desired terahertz wave is not generated from the light source, it is difficult to normally capture an image of an object. Additionally, a terahertz wave at an unintended frequency may be generated by an oscillation due to a parasitic capacitance in a circuit of the light source. In this case, an amount of current that is substantially equal to an amount of current to flow during a normal operation flows to the circuit of the light source. For this reason, the abnormality cannot be detected even by monitoring the current flowing to the light source. Thus, some measures to check the operation of a light source of the terahertz wave are to be provided.

A terahertz wave will be described. A terahertz wave is a radio wave typically having a frequency band from 0.1 THz to 30 THz. A terahertz wave has a longer wavelength than visible light and infrared light, and thus is less affected by scattering of light from an object and has high permeability to many substances. The wavelength of a terahertz wave is shorter than that of a millimeter wave, so that a high spatial resolution can be obtained. By taking advantage of these characteristics, applications to a safe imaging technique using terahertz waves in place of X-rays are expected. Specific examples of the expected applications to the imaging technique include a security check and a surveillance camera in a public place.

Exemplary embodiments will be described in detail below with reference to the accompanying drawings. The following exemplary embodiments illustrate an example where a terahertz wave camera system is used as a camera system. Each of the terahertz wave camera systems according to the exemplary embodiments can be applied to a security check and a surveillance camera, which are examples of the expected applications. The following exemplary embodiments are not intended to limit the disclosure. Multiple features are described in the exemplary embodiments. However, not all of these features are essential to the disclosure, and multiple such features can be combined as appropriate.

In the accompanying drawings, the same or like components are denoted by the same reference numerals, and redundant descriptions are omitted.

A camera system 1001 according to a first exemplary embodiment will be described with reference to FIGS. 1 to 3B.

FIG. 1 is a schematic diagram illustrating a configuration example of the camera system 1001. The camera system 1001 includes a reception unit 100, a transmission unit 103, a transmission unit 104, a transmission unit 105, a display unit 111, and a processing unit 110. In the camera system 1001 according to the present exemplary embodiment, the transmission units 103 to 105 are disposed at positions within a field angle where terahertz waves from the transmission units 103 to 105 can be received by the reception unit 100.

The transmission units 103 to 105 each irradiate an object 109 with a terahertz wave. The term "irradiation" used herein can also be referred to as radiation. The camera system 1001 includes a plurality of transmission units. However, the number of transmission units is not limited to three and the camera system 1001 can include any number of transmission units. For example, the number of transmission units included in the camera system 1001 can be one, two, or 16 or more. The frequency of a terahertz wave irradiated from each of the transmission units 103 to 105 includes any frequency components or a single frequency in a range from 0.1 THz to 30 THz. In a case where a human body is included as the object 109, many clothes have high permeability up to 1 THz. Accordingly, for example, in a case where the camera system 1001 is used for a concealed-object inspection, a terahertz wave in a frequency band from 0.3 THz to 1 THz can be used. Assume that, in the present exemplary embodiment, a frequency band including 0.45 THz is used. Also assume that the object 109 is moving along a movement direction 112.

In the transmission unit 103, a plurality of transmitters 106, each of which emits a terahertz wave, is disposed. For example, in the transmission unit 103, the transmitters 106 are disposed in an array of 2×2. In the transmission unit 104, a plurality of transmitters 107, each of which emits a terahertz wave, is disposed. For example, in the transmission unit 104, the transmitters 107 are disposed in an array of 2×2. In the transmission unit 105, a plurality of transmitters 108, each of which emits a terahertz wave, is disposed. For example, in the transmission unit 105, the transmitters 108 are disposed in an array of 2×2. The layout method and the number of the transmitters 106, 107, and 108 can be appropriately selected depending on the intensity and a directivity of terahertz waves.

The transmitters 106, 107, and 108 are each composed of one or more transmission elements, and are each mounted on a casing as a single chip. The casing is also referred to as a package or a mount member. Examples of the transmission elements can include a terahertz wave transmission element of a semiconductor element such as a resonant tunneling diode, and a photoexcitation terahertz wave transmission element. In one embodiment, each of the transmission elements includes an antenna structure so that impedance matching with atmosphere and terahertz wave generation efficiency can be improved. The size of the antenna structure is designed to be substantially equal to a wavelength to be used.

The reception unit 100 is an element that can detect a terahertz wave. The reception unit 100 can also be referred to as a terahertz wave camera. The reception unit 100 includes a receiver 102 and an optical system 101. The receiver 102 is a sensor that is partitioned by a plurality of pixels. The optical system 101 focuses a terahertz wave on a reception surface of the receiver 102. Further, the optical system 101 can image the terahertz wave on the reception surface of the receiver 102. The reception unit 100 has a configuration similar to a camera in which the receiver 102 and the optical system 101 are integrally mounted. However, the reception unit 100 can have a configuration in which the receiver 102 and the optical system 101 are stored in separate casings, respectively, and are installed in combination.

The receiver 102 is composed of one or more reception elements, and is mounted on a casing as a single chip. The casing is also referred to as a package or a mount member. Examples of the reception element can include a thermal detection element such as a bolometer, and a semiconductor detection element such as a Schottky barrier diode. Since the reception unit 100 functions as a camera to detect an image, the number of reception elements can also be referred to as the number of pixels, and the size of each reception element can also be referred to as a pixel size. For example, in a case where the camera system 1001 is used for a concealed-object inspection, 10,000 or more pixels are to be used. In other words, the receiver 102 can also be referred to as an area sensor having 100 pixels×100 pixels. Since the wavelength of a terahertz wave is several hundred μm, the size of a single reception element is determined based on this value. In view of the above, the size of the receiver 102 is typically 10 mm or more×10 mm or more. In view of the resolution and size, the number of pixels to be used is 20,000 pixels or more, and the size of the receiver 102 is several tens of mm or more on each side. The number of pixels to be used can be 100,000 pixels or more, and the size of the receiver 102 can be 500 mm or more on each side. Further, in order to improve the impedance matching with atmosphere and detection efficiency of the terahertz wave, in one embodiment, each reception element includes an antenna structure. The size of the antenna structure is designed to be substantially equal to a wavelength to be used.

The optical system 101 images the terahertz wave on the reception surface of the receiver 102. The optical system 101 can be an optical element such as a lens or a mirror. In a case where a lens is used as the optical system 101, it is to use, as a lens material, a material with a small loss against a terahertz wave to be used. Examples of the lens material can include Teflon® and high density polyethylene. The optical system 101 is an imaging optical system, and can be designed by a visible light method. A dashed-dotted line illustrated in FIG. 1 represents an optical axis of the optical system 101. In one embodiment, the optical axis matches the center of mass of the reception surface of the receiver 102. An aperture diaphragm can be provided in the optical system 101. A depth of focus of an object can be increased by stopping down the aperture diaphragm, i.e., by increasing an F-value. In other words, an object image in a wide range can be obtained. However, if the F-value is increased, the intensity of the terahertz wave that has been transmitted through the optical system 101 may be decreased. In one embodiment, the aperture is adjusted in view of the intensity of the terahertz wave from each of the transmission units 103 to 105.

The processing unit 110 is a processing apparatus such as a computer including a central processing unit (CPU), a memory, and a storage device. Image information acquired by the reception unit 100 is sent to the processing unit 110, and the processing unit 110 performs signal processing on the image information. The functions of the processing unit 110 can be provided in the reception unit 100. The processing unit 110 can perform determination processing to be described below and signal processing, and can control overall operations of the camera system 1001. In other words, the processing unit 110 can include a determination unit, a signal processing unit that processes signals, and a control unit. The processing unit 110 needs not necessarily be a processing apparatus such as a computer, but instead at least a part of processing can be performed in a cloud system. Further, a part of processing can be performed by an artificial intelligence (AI). The present exemplary embodiment illustrates a configuration in which the processing unit 110 includes the determination unit, the signal processing unit, and the control unit. However, the determination unit, the signal processing unit, and the control unit can be separately provided.

The display unit 111 can be a monitor of the computer of the processing unit 110, or can be prepared to display an image. The display unit 111 displays an image based on the image information formed by the processing unit 110.

To facilitate explanation of the present exemplary embodiment, assume that the following transmitters are provided in the configuration illustrated in FIG. 1. Assume that a terahertz wave is not generated from a transmitter 107a of the transmission unit 104, or an electromagnetic wave at a frequency different from a desired frequency is generated due to a parasitic oscillation or the like. Also assume that a transmitter 108a of the transmission unit 105 generates a terahertz wave at a desired frequency, but the intensity of the terahertz wave is decreased. The transmitters 107a and 108a are illustrated for descriptive purposes assuming a case where a malfunction occurs in the transmitters.

Figure 2B:
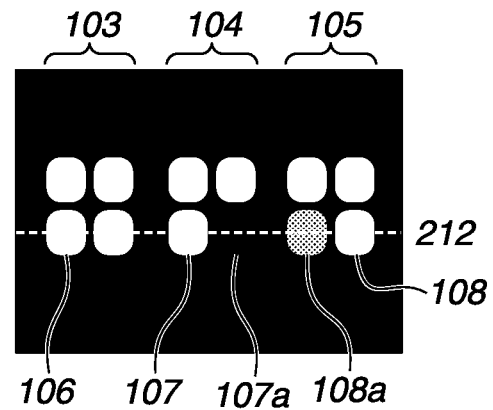
Figure 2C:
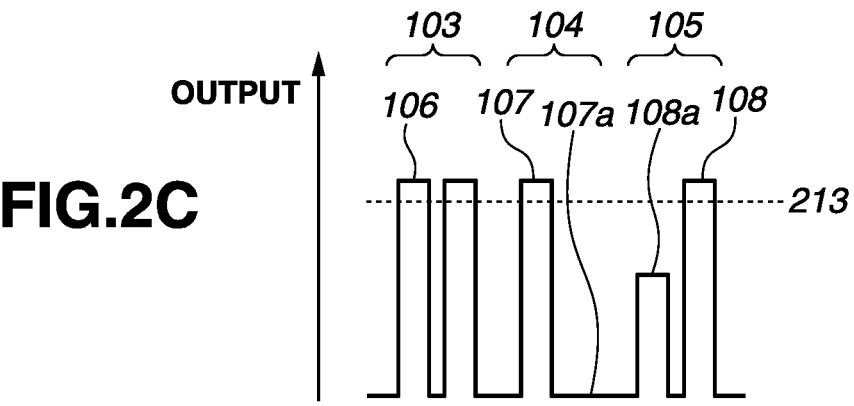
FIG. 2C is a schematic graph illustrating a method for processing therefor.

FIGS. 2A and 2B are schematic diagrams each illustrating an image captured by the camera system 1001 illustrated in FIG. 1, and FIG. 2C is a schematic graph illustrating a method for processing the image in FIG. 2B. FIG. 2A illustrates an image obtained by capturing an image of the object 109. This image capturing operation is performed in a main image capturing operation. For example, a concealed object is detected from the captured image. The main image capturing operation indicates an operation of capturing an image of an object. In the present exemplary embodiment, the captured image indicates an image obtained by capturing an image in a direction perpendicular to the movement direction 112 of the object 109, that is, an image obtained by capturing an image of a side surface of the object 109. An image capturing direction can be changed depending on the intended use. The image capturing direction can be identified based on a direction of the optical axis of the optical system 101. While the present exemplary embodiment assumes a case where the reception unit 100 detects a terahertz wave reflected by the object 109, the reception unit 100 can also detect a terahertz wave that has been transmitted through the object 109. Accordingly, positional relationships other than the positional relationship between the reception unit 100 and the transmission units 103 to 105, such as the positional relationship between the reception unit 100 and the object 109 and the positional relationship between the object 109 and the transmission units 103 to 105, can be changed as appropriate.

FIG. 2B illustrates a captured image of the transmission units 103 to 105. This image is captured in a state where the object 109 is not present, or in a state where the object 109 is located outside of a range of the field angle of the reception unit 100. The image illustrated in FIG. 2B indicates a two-dimensional distribution of light and dark images depending on the intensity of the terahertz wave generated from each of the transmission units 103 to 105. As the intensity increases, a lighter image can be obtained. In the image illustrated in FIG. 2B, the portions respectively corresponding to the transmission units 103 to 105 and the transmitters 106 to 108 illustrated in FIG. 1 are denoted by the same reference numerals. In this case, the contrast of the images respectively corresponding to the transmitters 107a and 108a is different from that of the images respectively corresponding to the transmitters 106 to 108. FIG. 2C is a schematic graph illustrating an output of a terahertz wave at a location indicated by a broken line 212 illustrated in FIG. 2B. A vertical axis represents an output. This output can also be referred to as an intensity.

A portion corresponding to the transmitter 107a illustrated in FIG. 2B is dark, and no signal is present in a desired terahertz wave band. The output corresponding to the transmitter 107a illustrated in FIG. 2C is "0". Accordingly, it is obvious that the transmitter 107a does not generate a terahertz wave at a desired frequency. A portion corresponding to the transmitter 108a illustrated in FIG. 2B is lighter than the portion corresponding to the transmitter 107a, but is darker than the other portions. The output corresponding to the transmitter 108a illustrated in FIG. 2C is lower than the other outputs. Therefore, it is obvious that the transmitter 108 generates a terahertz wave at a desired frequency, but the intensity of the terahertz wave is decreased.

Examples of a method for detecting a decrease in the intensity include a method in which an allowable lower-limit threshold 213 is preliminarily determined as illustrated in FIG. 2C and a determination is made based on whether the intensity is lower than the threshold. The output can be obtained based on an output intensity in a one-dimensional direction indicated by the broken line 212 in FIG. 2B, or can be set based on an output in each area identified from the image illustrated in FIG. 2B. As the output in each area, any value, such as a combined value of outputs from pixels in each area, or an average value of outputs from pixels in each area, can be set. Further, the output in each area can be obtained based on an output from one pixel in each area. This determination processing is performed by the processing unit 110 illustrated in FIG. 1, but instead a determination circuit can be provided in a readout circuit of the receiver 102. In the manner as described above, a transmission unit inspection operation can be performed.

Figure 3A:
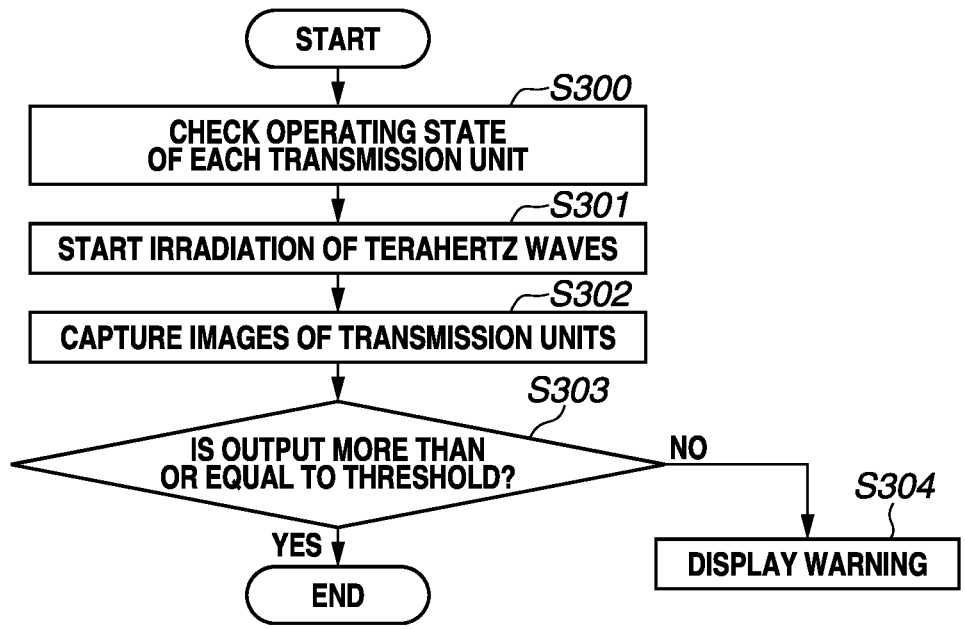
FIGS. 3A and 3B are flowcharts each illustrating an operation to be executed by the camera system according to the first exemplary embodiment.

FIG. 3A is a flowchart illustrating the transmission unit inspection operation. First, in step S300, an operating state of each transmission unit is checked. In this step, it is checked whether each transmission unit irradiates a terahertz wave. Depending on the operating state, a sub-flow for switching an operation of the transmission unit can be performed. Further, an operation flow for skipping the subsequent step S301 depending on the operating state can be added. In step S301, the irradiation of terahertz waves is started. The transmission units 103 to 105 operate to irradiate terahertz waves. In a case where the transmission units 103 to 105 are already in an irradiation state, the irradiation state is maintained. The irradiation state is also referred to as a light state. In step S302, images of the transmission units 103 to 105 are captured. The reception unit 100 detects the terahertz waves irradiated from the transmission units 103 to 105. The image acquired in the irradiation state is also referred to as a light image. In step S303, it is determined whether the output of each of the transmission units 103 to 105 is more than or equal to a threshold based on a detected signal or an image based on the signal. In a case where the output is more than or equal to the threshold (Yes in step S303), the inspection is completed. In a case where the output is less than the threshold (No in step S303), the processing proceeds to step S304. In step S304, for example, the processing unit 110 issues an instruction and displays a warning on the display unit 111. In addition, in a case where the output is less than the threshold (N in step S303), for example, the processing unit 110 can perform an operation to issue an alert sound. This operation enables checking of the operation of each of the transmission units 103 to 105 that cannot be visually recognized.

Figure 3B:
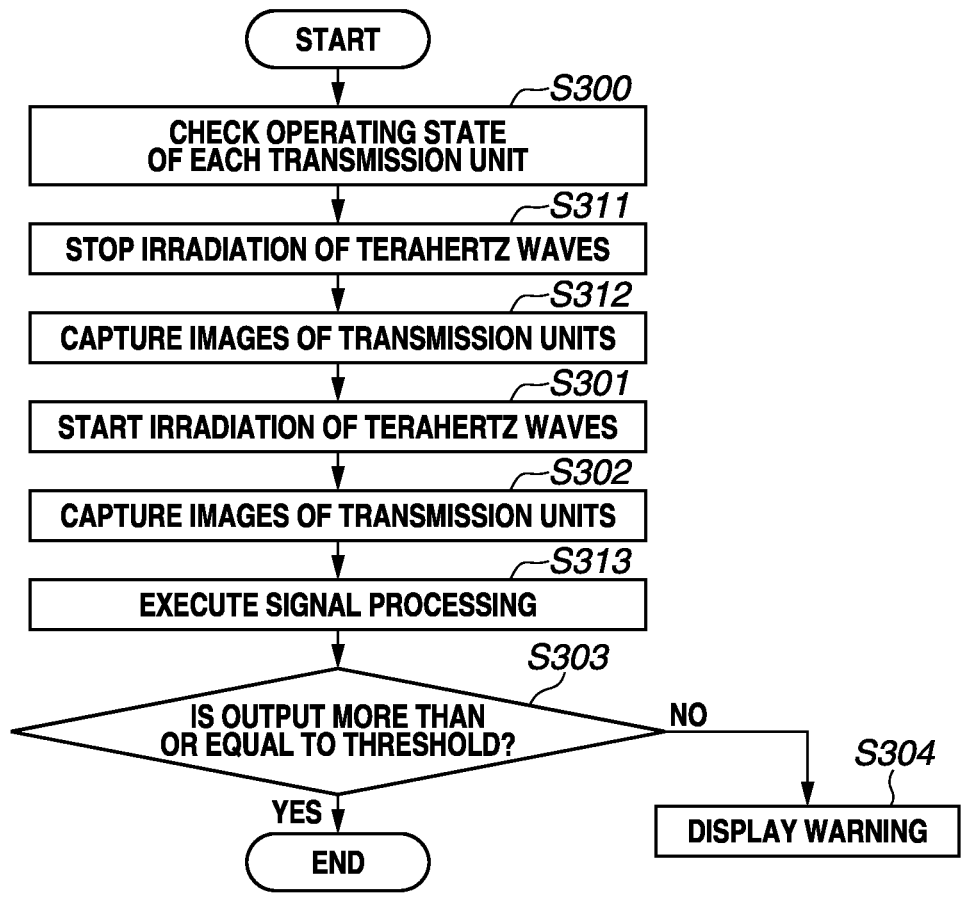

In some cases, spatial noise or shading may be superimposed on the image illustrated in FIG. 2B due to the circuit of the receiver 102. In this case, the following operation is to be performed. FIG. 3B is a flowchart illustrating another operation to be executed in the transmission unit inspection operation. In FIG. 3B, the descriptions of operations similar to those illustrated in FIG. 3A are omitted. In step S311, the irradiation of terahertz waves is stopped. For example, the operation of each of the transmission units 103 to 105 is stopped to thereby stop the irradiation of terahertz waves. Alternatively, the transmission units 103 to 105 operate to stop the irradiation of terahertz waves. More alternatively, a member for blocking terahertz waves is disposed in front of the transmission units 103 to 105. In a case where the transmission units 103 to 105 are already in a non-irradiation state, the non-irradiation state is maintained. The non-irradiation state is also referred to as a dark state. In step S312, images of the transmission units 103 to 105 are captured in the non-irradiation state. Each of the images captured in the non-irradiation state is also referred to as a dark image. Then, the operations in steps S301 and S302 are performed. In step S313, signal processing is performed. In the signal processing, processing for removing information about the dark image from information about the light image is performed. The dark image is referred to as a reference signal. In other words, in the signal processing, the reference signal is removed from the light image. In step S303, the determination is made in a state where the signal processing has been performed, and then the processing is completed, or step S304 is executed. This processing leads to a reduction in noise and an improvement in the accuracy of the determination in step S303. The improvement in determination accuracy leads to an improvement in the accuracy of detecting a malfunction in the transmission units 103 to 105.

If noise randomly occurs during a predetermined period of time, the following operation can be performed. In the operation flow illustrated in FIG. 3A, step S302 can be performed a plurality of times and a plurality of light images can be averaged. Step S302 can be performed based on the averaged image. In the operation flow illustrated in FIG. 3B, if noise randomly occurs during a predetermined period of time, step S312 can be performed a plurality of times and a plurality of dark images can be averaged. In step S313, information about the averaged dark image can be removed from the light image. Further, in the operation flow illustrated in FIG. 3B, if noise randomly occurs during a predetermined period of time, each of steps S302 and S312 can be performed a plurality of times, and then a plurality of light images can be averaged and a plurality of dark images can be averaged. In step S313, information about the averaged dark image can be removed from the averaged light image. This processing makes it possible to reduce noise that randomly occurs during a predetermined period of time. Consequently, it is possible to improve the accuracy of detecting a malfunction in the transmission units 103 to 105.

In steps S301 and S302, the following operation can be performed. For example, in step S301, all the transmission units 103 to 105 can be brought into the irradiation state, and then step S302 can be performed. Alternatively, the transmission units 103 to 105 can be brought into the irradiation state from the non-irradiation state by rotation, and an image capturing operation can be performed every time any of the transmission units 103 to 105 is brought into the irradiation state. In other words, steps S301 and S302 are performed a plurality of times by changing the operating state of each of the transmission units 103 to 105. First, in step S301, the transmission unit 103 is brought into the irradiation state, and the transmission unit 104 and the transmission unit 105 are brought into the non-irradiation state. Then, step S302 is performed. Step S301 is performed again, and the transmission unit 103 and the transmission unit 105 are brought into the non-irradiation state and the transmission unit 104 is brought into the irradiation state. Then, step S302 is performed. Step S301 is performed again, and the transmission unit 103 and the transmission unit 104 are brought into the non-irradiation state and the transmission unit 105 is brought into the irradiation state. Then, step S302 is performed. Not only the transmission units 103 to 105, but also the transmitters 106 to 108 can be sequentially turned on and the image capturing operation can be performed every time this turning-on operation is performed. Alternatively, the image capturing operation can be performed by turning on a specific transmission unit or transmitter as an inspection target.

The image capturing operation in respective steps S302 and S312 can be an operation of capturing one frame (still image), a plurality of discontinuous frames, or temporally continuous frames (moving image). In the case of capturing a moving image, data corresponding to one frame can be extracted from the image and the extracted data can be processed.

Information about the number of transmission units and transmitters and an arrangement relationship between the transmission units and transmitters can be preliminarily held in the processing unit 110. Examples of the information include information indicating that the three transmission units 103 to 105 each including four transmitters disposed in an array of 2×2 are aligned. Based on this information, each transmission unit and each transmitter can be extracted from the captured images of the transmission units and transmitters. Each transmission unit and each transmitter can also be extracted from the images using the AI. The AI can be provided in the processing unit 110, a cloud system, or the like. This processing enables the display unit 111 to display the state of each of the transmission units 103 to 105. Therefore, at least one of an improvement in the efficiency of the transmission unit inspection operation and an improvement in the convenience of the transmission unit inspection operation can be achieved.

The camera system 1001 can include an extra transmission unit (not illustrated). After step S304, the extra transmission unit can be switched to be operated. After step S304, the output of each of the transmission units 103 to 105 can also be increased.

The flow of the transmission unit inspection operation illustrated in FIGS. 3A and 3B can be carried out, when the camera system 1001 is installed in a place for operation, when maintenance work is periodically performed, or when the operation of the camera system 1001 is started. Such flow can be carried out every time the main image capturing operation is performed. In other words, after step S304, the processing can transition to the main image capturing operation.

The dark image acquired in step S312 can also be acquired by bringing the transmission units 103 to 105 into a transmission state. In this case, a method for preventing the reception unit 100 from being directed toward the transmission units 103 to 105 is to be provided, or the reception unit 100 or the transmission units 103 to 105 are to be provided with a blocking unit for blocking terahertz waves, and when the dark image is acquired, the blocking unit are moved to a space between the reception unit 100 and the transmission units 103 to 105. This operation makes it possible to acquire the dark image in a state where terahertz waves are not incident on the reception unit 100. This method can be carried out in a case where the operation of the transmission units 103 to 105 or the other portion is unstable due to the operation of switching the state of each of the transmission units 103 to 105.

A camera system 1002 according to a second exemplary embodiment will be described with reference to FIGS. 4A and 4B.

Figure 4A:
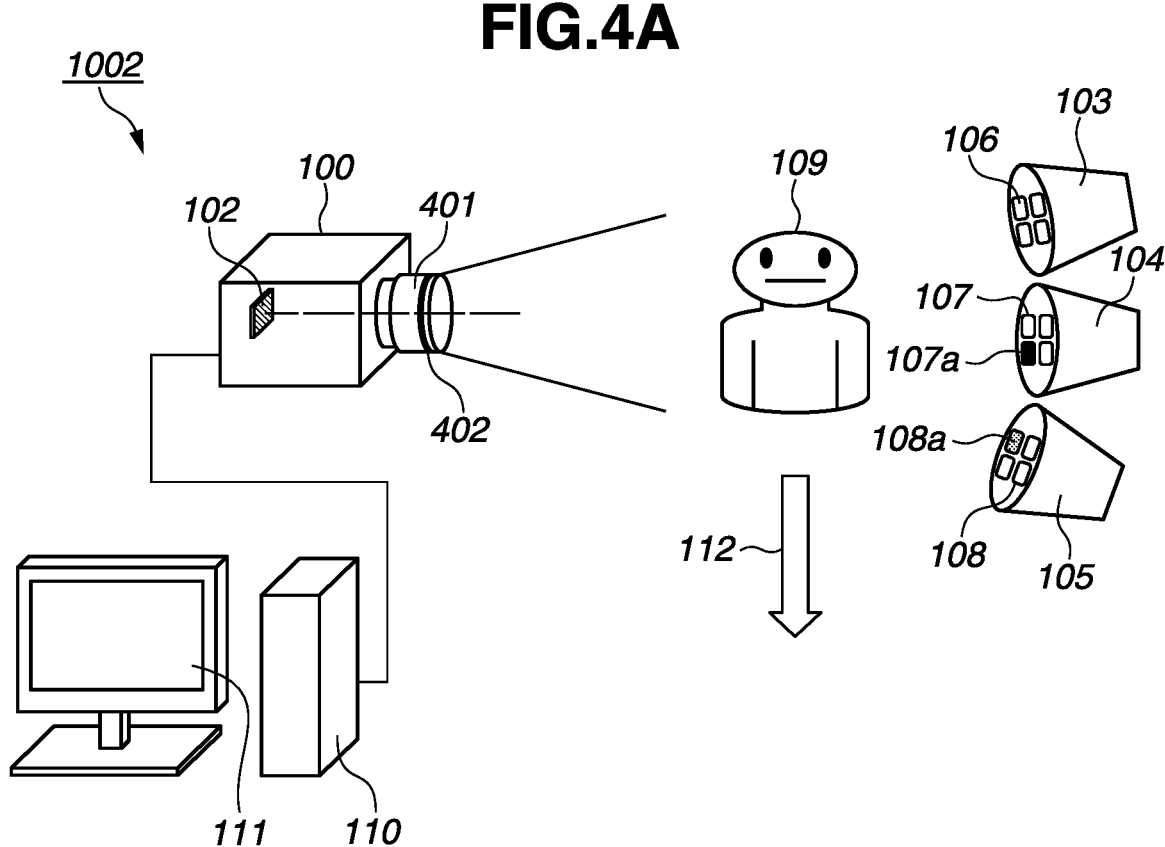
FIG. 4A is a schematic diagram illustrating a configuration of a camera system according to a second exemplary embodiment.

FIG. 4A is a schematic diagram illustrating a configuration example of the camera system 1002. A configuration of an optical system in the camera system 1002 is different from that of the camera system 1001 according to the first exemplary embodiment. An optical system 401 has a configuration in which an adjustment mechanism 402 for adjusting a focus is added to the optical system 101 illustrated in FIG. 1. Components of the second exemplary embodiment that are the same as those of the first exemplary embodiment are denoted by the same reference numerals and detailed descriptions thereof are omitted.

The adjustment mechanism 402 can focus the object 109 when an image of the object 109 is captured, and can focus the transmission units 103 to 105 when the transmission unit inspection operation is performed.

Figure 4B:
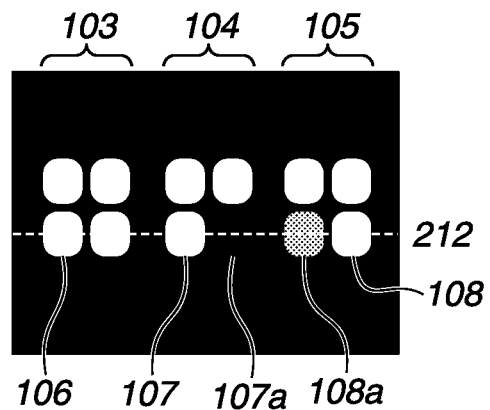
FIG. 4B is a schematic diagram illustrating an image captured by the camera system according to the second exemplary embodiment.

FIG. 4B illustrates an image captured by the camera system 1002 illustrated in FIG. 4A. Reference numerals used in FIG. 4B are the same as those used in FIG. 2B. The adjustment mechanism 402 can perform the image capturing operation by focusing an electromagnetic wave on each of the transmission units 103 to 105. Accordingly, a clearer image i.e., an output with higher precision than that of the first exemplary embodiment can be obtained.

With this configuration, the transmission unit inspection operation can be performed with high accuracy even in a layout in which a distance from the reception unit 100 to the transmission units 103 to 105 is different from a distance from the reception unit 100 to the object 109. Further, the degree of freedom of installation of the transmission units 103 to 105 can be improved.

A camera system 1003 according to a third exemplary embodiment will be described with reference to FIGS. 5A to 5C.

Figure 5A:
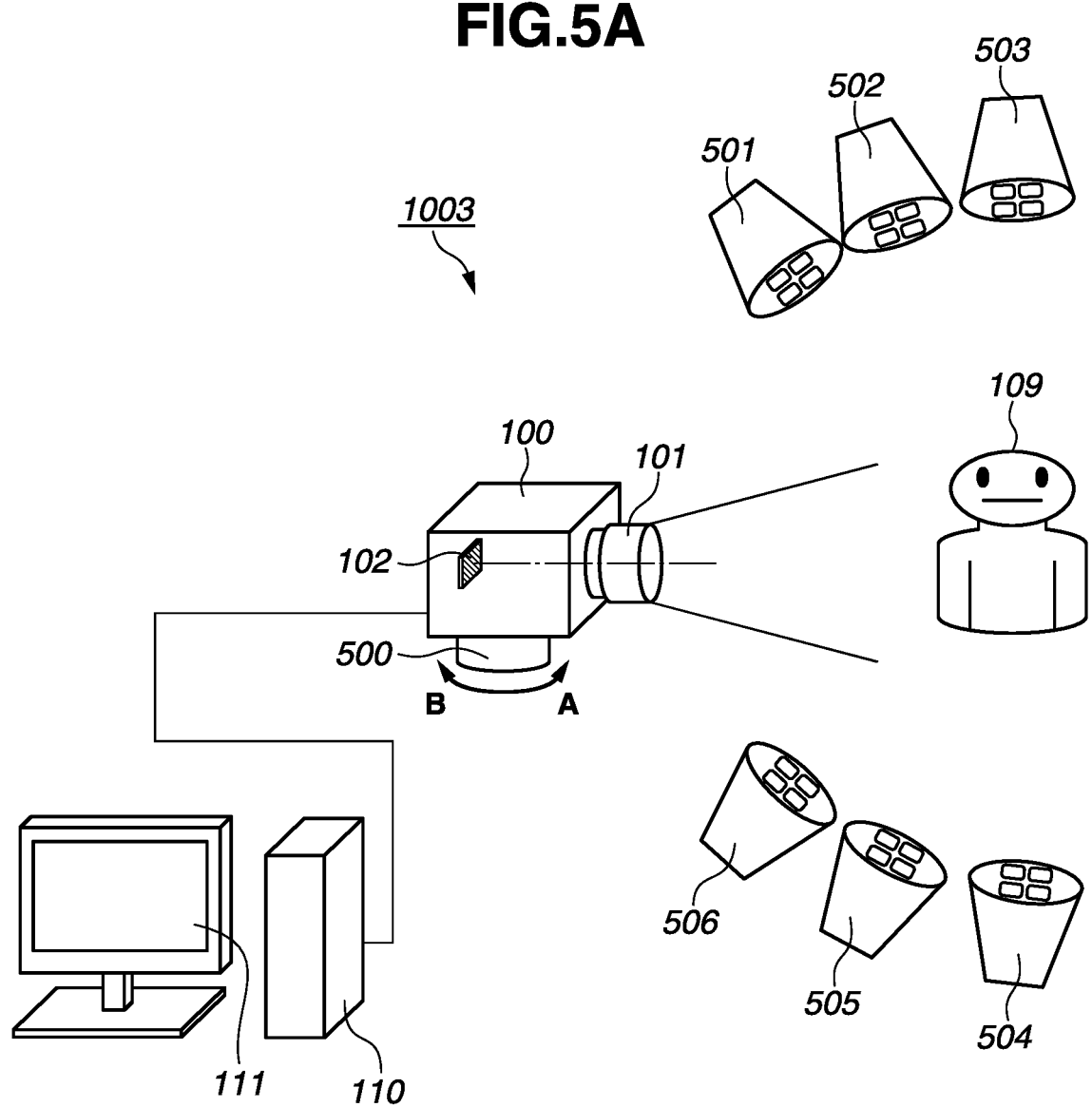
FIG. 5A is a schematic diagram illustrating a configuration of a camera system according to a third exemplary embodiment.

FIG. 5A is a schematic diagram illustrating a configuration example of the camera system 1003. The camera system 1003 has a configuration in which a movable unit 500 that changes an orientation of the reception unit 100 is added to the camera system 1001 according to the first exemplary embodiment. Further, the camera system 1003 differs from the camera system 1001 in regard to the number of transmission units and the layout of the transmission units. Components of the third exemplary embodiment that are the same as those of the first exemplary embodiment are denoted by the same reference numerals and detailed descriptions thereof are omitted.

The camera system 1003 includes transmission units 501 to 506. The transmission units 501 to 503 are grouped as a set of transmission units, and the transmission units 504 to 506 are grouped as another set of transmission units. The object 109 is located between the set of the transmission units 501 to 503 and the set of the transmission units 504 to 506. The reception unit 100 is located between the set of the transmission units 501 to 503 and the set of the transmission units 504 to 506. The movable unit 500 is a member that changes the image capturing direction of the reception unit 100 and also supports the reception unit 100. In the case of performing the transmission unit inspection operation on the transmission units 501 to 503, the movable unit 500 is rotated in a direction A. In the case of performing the transmission unit inspection operation on the transmission units 504 to 506, the movable unit 500 is rotated in a direction B. The movable unit 500 receives a signal from the processing unit 110 and operates in response to the signal. The movable unit 500 can communicate with the processing unit 110. In the configuration illustrated in FIG. 5A, the movable unit 500 communicates with the processing unit 110 through the reception unit 100, but instead can directly communicate with the processing unit 110.

Figure 5B:
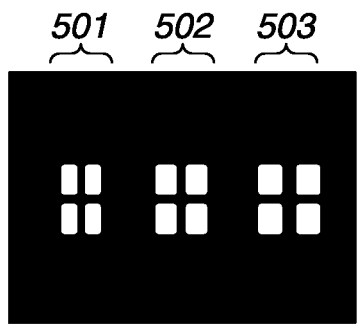
FIGS. 5B and 5C are schematic diagrams each illustrating an image captured by the camera system according to the third exemplary embodiment.
Figure 5C:
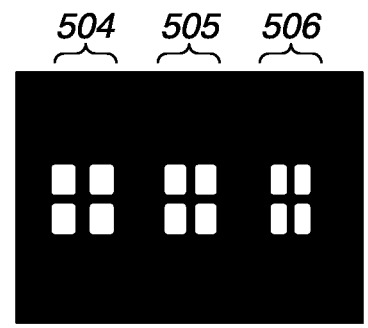

FIGS. 5B and 5C illustrate images captured with the configuration illustrated in FIG. 5A. FIG. 5B illustrates images captured when the movable unit 500 is rotated in the direction A. FIG. 5C illustrates images acquired when the movable unit 500 is rotated in the direction B. FIG. 5B illustrates the images corresponding to the transmission units 501 to 503, respectively. FIG. 5C illustrates the images corresponding to the transmission units 504 to 506, respectively. Each white area corresponds to a transmitter in each transmission unit. The provision of the movable unit 500 having a configuration as described above makes it possible to inspect a plurality of transmission units located in multiple directions by using one reception unit 100. As illustrated in the layout of FIG. 5A, in a case where an irradiation surface of each of the transmission units 501 to 506 and a reception surface of the reception unit 100 do not face each other, the output of each of the transmission units 501 to 506, which is detected by the reception unit 100, may be decreased due to a directivity of each of the transmission units 501 to 506 and the cosine law. In this case, signal processing to correct the output before the output is determined is performed. Alternatively, the threshold value is to be changed. During the image capturing operation, images can be continuously captured while the movable unit 500 is moved in the direction A or in the direction B. Like in the second exemplary embodiment, the optical system 101 can be provided with the adjustment mechanism 402, or a wide angle lens can be used. In this case, a plurality of transmission units can be captured in one image, but the resolution of each transmission unit is decreased. Accordingly, it is desirable to carry out the image capturing operation by taking into consideration the number of pixels.

During the transmission unit inspection operation, a reflecting member can be provided at a position corresponding to the object 109. The reflecting member makes terahertz waves, which are irradiated from the transmission units 501 to 506, be reflected, and the reflected waves can be detected by the reception unit 100. It is also possible to inspect the light source in a state where an image of a front surface of each transmission unit is captured by adjusting the position or angle of the reflecting member.

The movable unit 500 according to the present exemplary embodiment can perform a rotational operation in the direction A or in the direction B, i.e., can move in a horizontal direction, but instead can move in any direction including a vertical direction. The structure of the movable unit 500 can also be applied to a general structure.

As described above in the present exemplary embodiment, the provision of the movable unit 500 that changes the image capturing direction makes it possible to effectively inspect a plurality of transmission units located in multiple directions.

A camera system 1004 according to a fourth exemplary embodiment will be described with reference to FIG. 6.

Figure 6:
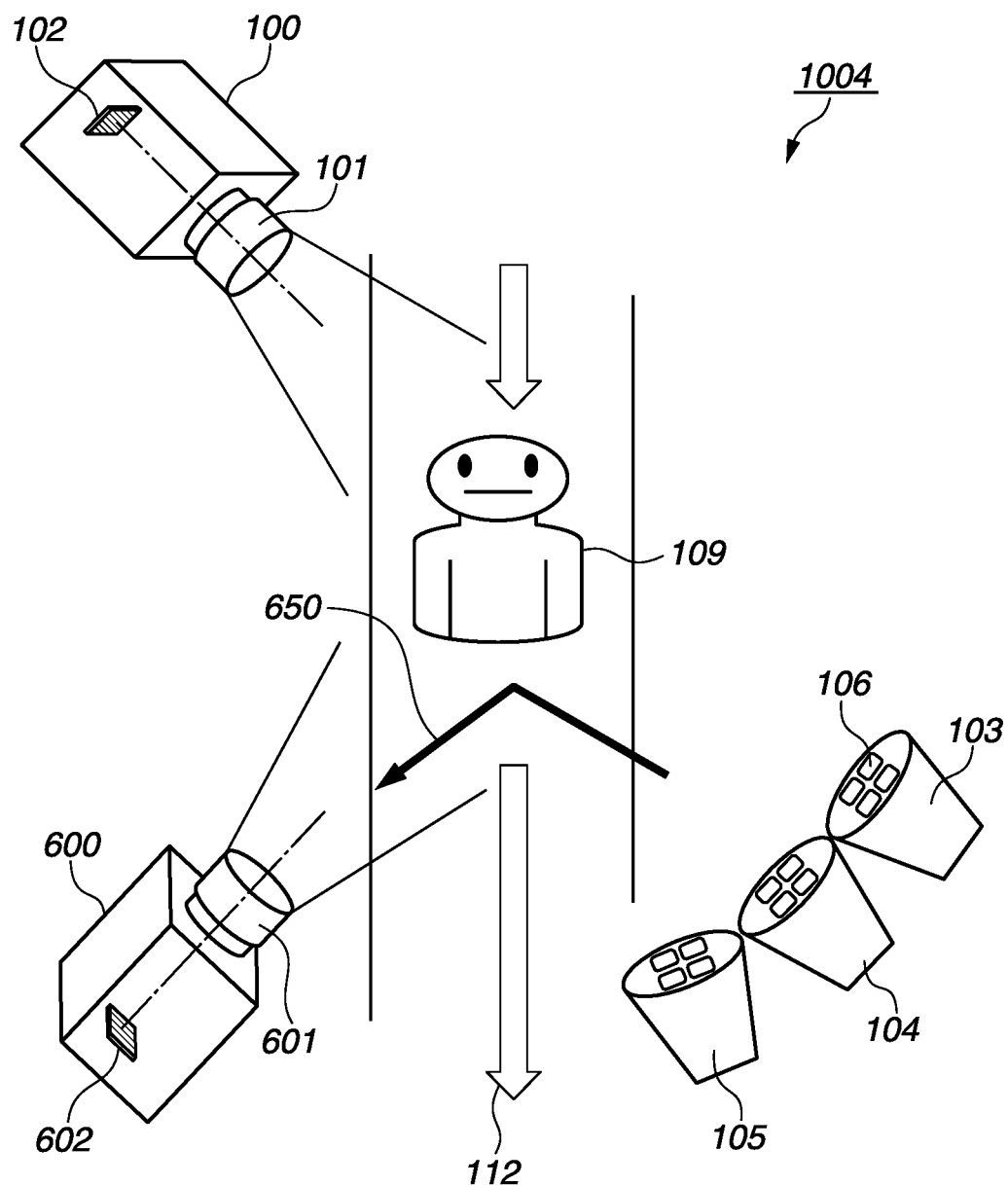
FIG. 6 is a schematic diagram illustrating a configuration of a camera system according to a fourth exemplary embodiment.

FIG. 6 is a schematic diagram illustrating a configuration example of the camera system 1004. The camera system 1004 has a configuration in which another reception unit 600 is added to the camera system 1001 according to the first exemplary embodiment. Components of the fourth exemplary embodiment that are the same as those of the first exemplary embodiment are denoted by the same reference numerals and detailed descriptions thereof are omitted. In FIG. 6, the processing unit 110 and the display unit 111 are not illustrated.

Like the reception unit 100, the reception unit 600 includes an optical system 601 and a receiver 602. A component 650 that is reflected by the object 109 and is included in the terahertz waves generated from the transmission units 103 to 105 is imaged on the receiver 602, and the receiver 602 detects a signal. In the present exemplary embodiment, the reflected wave from the object 109 is detected. Accordingly, the transmission units 103 to 105, the object 109, and the reception unit 600 are located in a V-shape as illustrated in FIG. 6. In other words, a direction connecting the transmission units 103 to 105 and the object 109 intersects with a direction connecting the object 109 and the reception unit 600. The reception unit 100 is provided to inspect the transmission units 103 to 105. The transmission unit inspection operation can be performed at a timing when the object 109 is not present.

With this configuration, the reception unit 600 that captures an image of the object 109 and the reception unit 100 that performs the transmission unit inspection operations are separately provided. Accordingly, each configuration can be simplified, for example, by fixing the focus or image capturing direction, and the transmission unit inspection operation and the image capturing operation can be effectively performed.

A camera system 1005 according to a fifth exemplary embodiment will be described with reference to FIGS. 7 to 8D.

Figure 7:
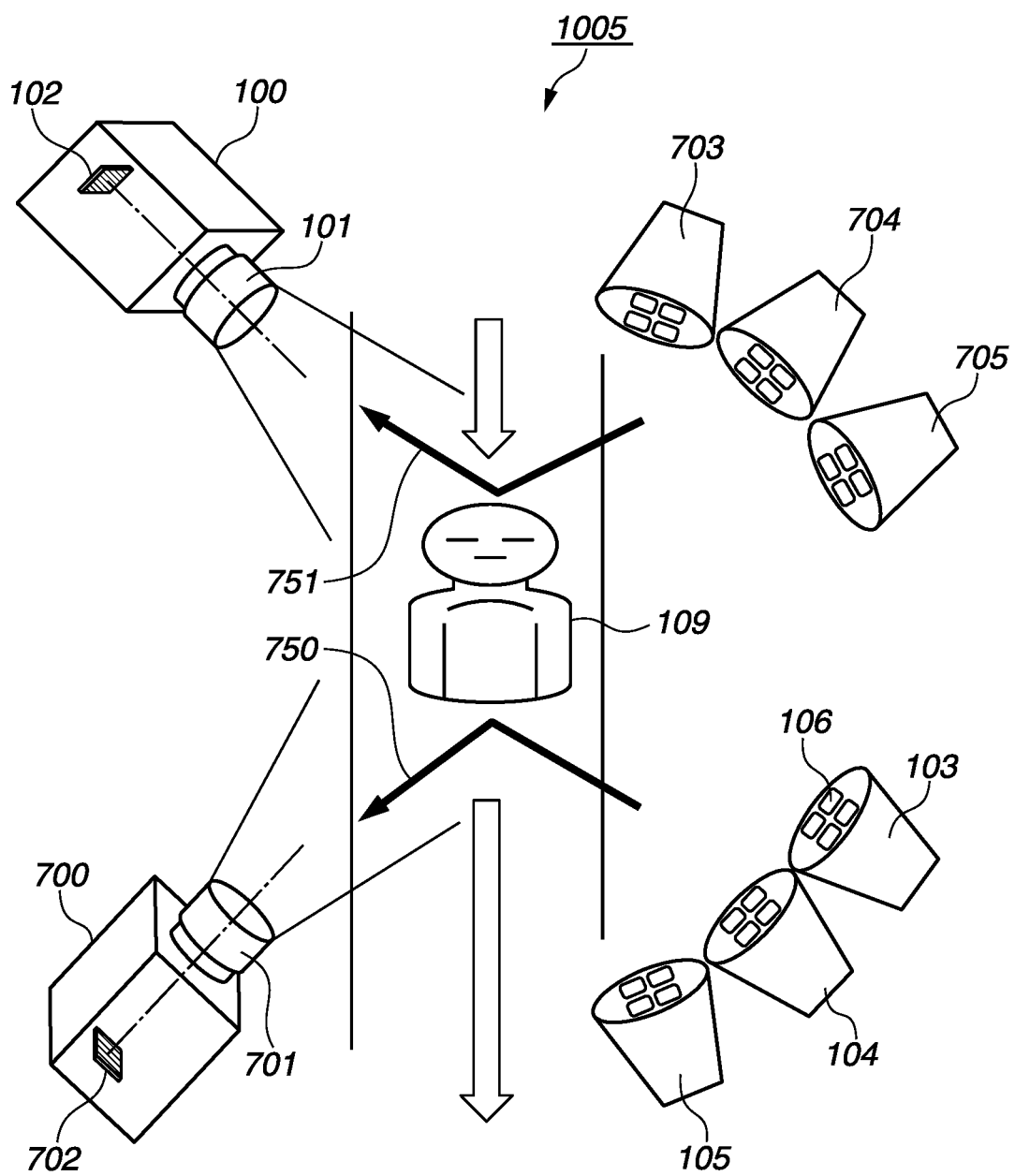
FIG. 7 is a schematic diagram illustrating a configuration of a camera system according to a fifth exemplary embodiment.
Figure 8A:
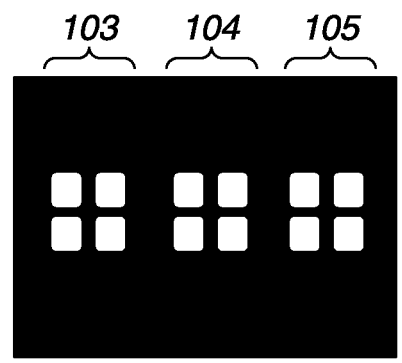
FIGS. 8A, 8B, 8C and 8D are schematic diagrams each illustrating an image captured by the camera system according to the fifth exemplary embodiment.
Figure 8B:
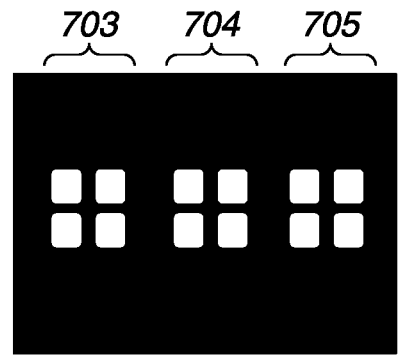
Figure 8C:
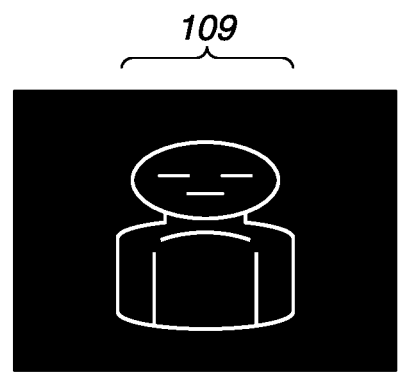
Figure 8D:
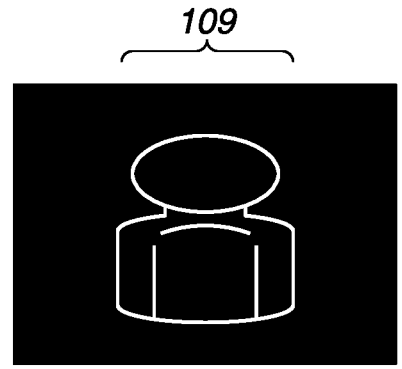

FIG. 7 is a schematic diagram illustrating a configuration example of the camera system 1005. The camera system 1005 has a configuration in which a reception unit 700 and transmission units 703 to 705 are added to the camera system 1001 according to the first exemplary embodiment. The reception unit 100 captures an image of a back surface of the object 109, and the reception unit 700 captures an image of a front surface of the object 109. Components of the fifth exemplary embodiment that are the same as those of the first exemplary embodiment are denoted by the same reference numerals and detailed descriptions thereof are omitted. In FIG. 7, the processing unit 110 and the display unit 111 are not illustrated. FIGS. 8A to 8D illustrate images captured with the configuration illustrated in FIG. 7. The components illustrated in FIG. 8A that correspond to those illustrated in FIG. 2B are denoted by the same reference numerals.

In the camera system 1005, the units are disposed as follows. The reception unit 100 is disposed to face the transmission units 103 to 105, and the reception unit 700 is disposed to face the transmission units 703 to 705. A direction connecting the reception unit 100 and the transmission units 103 to 105 intersects with a direction connecting the reception unit 700 and the transmission units 703 to 705.

Like the reception unit 100, the reception unit 700 includes an optical system 701 and a receiver 702. A component 750 that is reflected by the object 109 from the terahertz waves generated from the transmission units 103 to 105 is imaged on the receiver 702, and the receiver 702 detects the signal.

The operation of the camera system 1005 will be described below with reference to FIG. 3A. In steps S301 and S302, the reception unit 100 captures images of the transmission units 103 to 105, and the reception unit 700 captures images of the transmission units 703 to 705. Based on the captured images, the transmission units 103 to 105 and the transmission units 703 to 705 are inspected. Steps S301 and S302 may be executed on the transmission units 103 to 105, may be executed on the transmission units 703 to 705, or may be executed on the transmission units 103 to 105 and the transmission units 703 to 705. In any case, the reception unit 100 or the reception unit 700 is used depending on the case. FIG. 8A illustrates images obtained when the reception unit 100 captures images of the transmission units 103 to 105. FIG. 8B illustrates images obtained when the reception unit 700 captures images of the transmission units 703 to 705.

In the main image capturing operation, the following operation is performed. Terahertz waves irradiated from the transmission units 103 to 105 are reflected on the front surface of the object 109, and the reflected component 750 is received by the reception unit 700. Thus, an image of the front surface of the object 109 can be acquired. Terahertz waves irradiated from the transmission units 703 to 705 are reflected on the back surface of the object 109, and a reflected component 751 is received by the reception unit 100. Thus, an image of the back surface of the object 109 can be acquired. FIG. 8C illustrates the image obtained when the reception unit 700 captures an image of the object 109. FIG. 8D illustrates the image obtained when the reception unit 100 captures an image of the object 109.

In the camera system 1005 capable of capturing images of the front surface and the back surface of the object 109, the image of the object 109 can be captured and the transmission unit inspection operation can be performed. This configuration leads to simplification of the entire system of the camera system 1005, and makes it possible to effectively perform the light source inspection operation.

Some exemplary embodiments of the disclosure have been described above. However, the disclosure is not limited to the above-described exemplary embodiments and can be modified or altered in various ways within the scope of the disclosure. The components of the camera systems according to the above-described exemplary embodiments can be combined and used.

Further, in each exemplary embodiment, operations to be performed by the reception units, the transmission units, and the movable unit can be converted into a system to be automatically controlled. Specific examples of the operations include turning on/off operations of the transmission units, an operation of changing the image capturing direction by rotating the movable unit, focus adjustment and image capturing operations of the reception units, and a periodical transmission unit inspection operation. These operations can be arbitrarily combined and automated, which leads to a reduction in human workload.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An inspection method comprising:
   acquiring a first terahertz image of a plurality of transmission units in a state where the plurality of transmission units is irradiating an terahertz wave;
   determining whether an output of the terahertz wave from the plurality of transmission units is more than or equal to a threshold based on information about the first terahertz image; and
   performing, in a case where the output of the terahertz wave is less than the threshold, an operation to enable checking of the operation of each of the plurality of transmission units.

2. The inspection method according to claim 1, further comprising:
   bringing the plurality of transmission units into a transmission state before the acquiring.

3. The inspection method according to claim 2, further comprising:
   bringing the plurality of transmission units into a non-irradiation state before bringing the plurality of transmission units into the transmission state; and
   acquiring a second terahertz image of the plurality of transmitting units in the non-irradiation state.

4. The inspection method according to claim 3, further comprising:
   removing information about the second terahertz image from the information about the first terahertz image,
   wherein whether the output of the terahertz wave from the plurality of transmission units is more than or equal to the threshold is determined based on the information about the first terahertz image from which the information about the second terahertz image is removed.

5. The inspection method according to claim 3, wherein the acquiring the second terahertz image of the plurality of transmitting units in the non-irradiation state is repeated a plurality of times, and a plurality of second terahertz images is acquired.

6. The inspection method according to claim 5, further comprising:
   removing information about the plurality of second terahertz images from the information about the first terahertz image,
   wherein whether the output of the terahertz wave from the plurality of transmission units is more than or equal to the threshold is determined based on the information about the first terahertz image from which the information about the plurality of second terahertz images is removed.

7. The inspection method according to claim 1, further comprising:
   controlling a first operation for capturing an image of the plurality of transmission units in the state where the plurality of transmission units is irradiating the terahertz wave; and
   controlling a second operation for capturing an image of the plurality of transmission units in a state where the plurality of transmission units is not irradiating the terahertz wave.

8. The inspection method according to claim 1, further comprising:
   acquiring second image information obtained by capturing an image of the plurality of transmission units in a state where the plurality of transmission units is not irradiating the terahertz wave, and
   before the determining, removing the information about the second terahertz image from the information about the first terahertz image.

9. The inspection method according to claim 1, further comprising:
   operating an extra transmission unit in a case where some outputs of the plurality of transmission units are smaller than the threshold.

10. The inspection method according to claim 1, further comprising:
    adjusting focus of an optical system for acquiring the first terahertz image to focus on the plurality of transmission units before acquiring the first terahertz image of the plurality of transmitting units in the transmission state.

11. The inspection method according to claim 1, wherein in a case where the output is less than the threshold, an operation to issue at least one of an instruction, a warning, and an alert sound is performed.

12. The inspection method according to claim 1, wherein the terahertz wave is in a frequency band from 0.1 THz to 30 THz.

13. A system comprising:
    a plurality of transmission units configured to generate a terahertz wave;
    a first reception unit configured to detect the terahertz wave; and
    a processing unit configured to conduct an inspection operation,
    wherein the inspection operation includes acquiring first image information obtained by capturing an image of the plurality of transmission units in a state where the plurality of transmission units is irradiating the terahertz wave, and determining whether an output of the terahertz wave from the plurality of transmission units is more than or equal to a threshold based on the first image information, and
    wherein, in a case where the output of the terahertz wave is less than the threshold, an operation is performed to enable checking of the operation of each of the plurality of transmission units.

14. The system according to claim 13, wherein the processing unit is configured to control a first operation for capturing an image of the plurality of transmission units in the state where the plurality of transmission units is irradiating the terahertz wave, and a second operation for capturing an image of the plurality of transmission units in a state where the plurality of transmission units is not irradiating the terahertz wave.

15. The system according to claim 14, wherein the processing unit performs processing for acquiring the first image information by the first operation, acquiring second image information by the second operation, and removing the second image information from the first image information.

16. The system according to claim 14, further comprising:
    a second reception unit,
    wherein the processing unit is configured to control a third operation for the second reception unit to capture an image of an object.

17. The system according to claim 13, further comprising:
    a movable unit provided with the reception unit and configured to change an orientation of the reception unit.

18. The system according to claim 13, further comprising:
an optical system configured to focus the terahertz wave on the first reception unit.

19. The system according to claim 18, wherein the optical system includes a focus adjustment mechanism.

20. The system according to claim 13, further comprising:
a movable unit configured to be provided with the reception unit and to change an orientation of the reception unit,
wherein in the inspection operation, the movable unit turns the reception unit to the plurality of transmission units.

21. The system according to claim 13,
wherein the processing unit is configured to control a first operation for capturing an image of the plurality of transmission units in the state where the plurality of transmission units is irradiating the terahertz wave, and
a second operation for capturing an image of the plurality of transmission units in a state where the plurality of transmission units is not irradiating the terahertz wave, and
wherein the processing unit performs, before the determining, processing for acquiring the first image information by the first operation, acquiring second image information by the second operation, and removing the second image information from the first image information.

22. The system according to claim 13, wherein in a case where the output is less than the threshold, the processing unit is configured to perform an operation to issue at least one of an instruction, a warning, and an alert sound.

23. The system according to claim 13, wherein the terahertz wave is in a frequency band from 0.1 THz to 30 THz.

* * * * *